May 17, 1966  C. E. HOOK ETAL  3,251,531

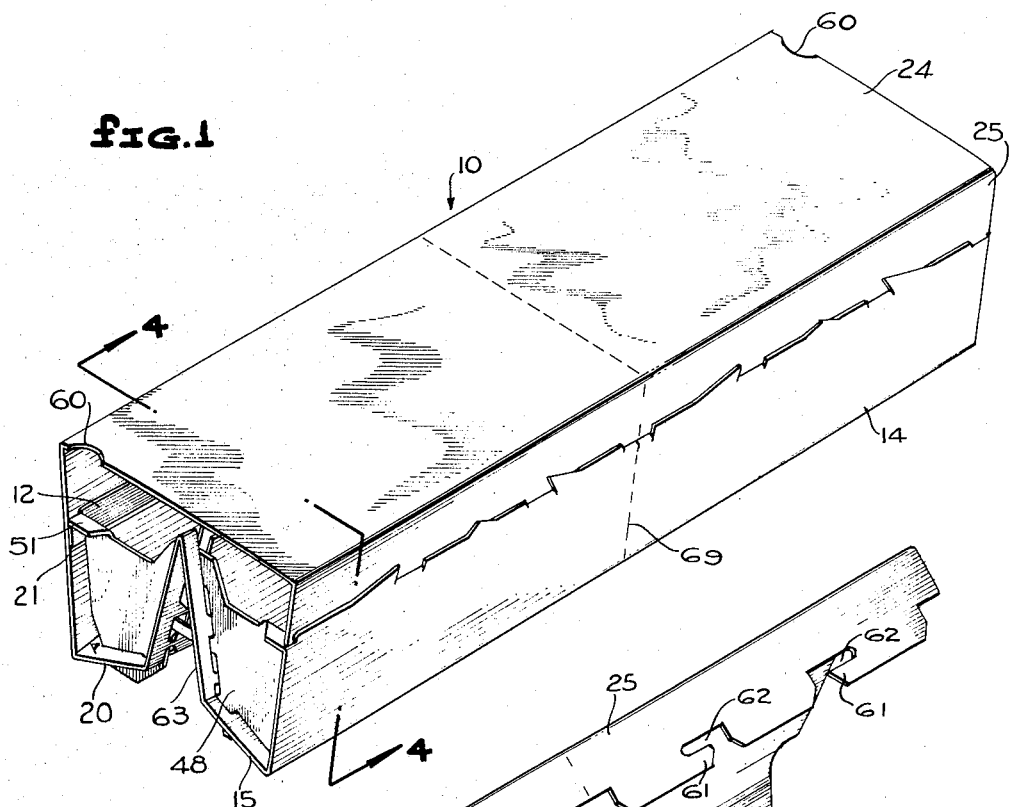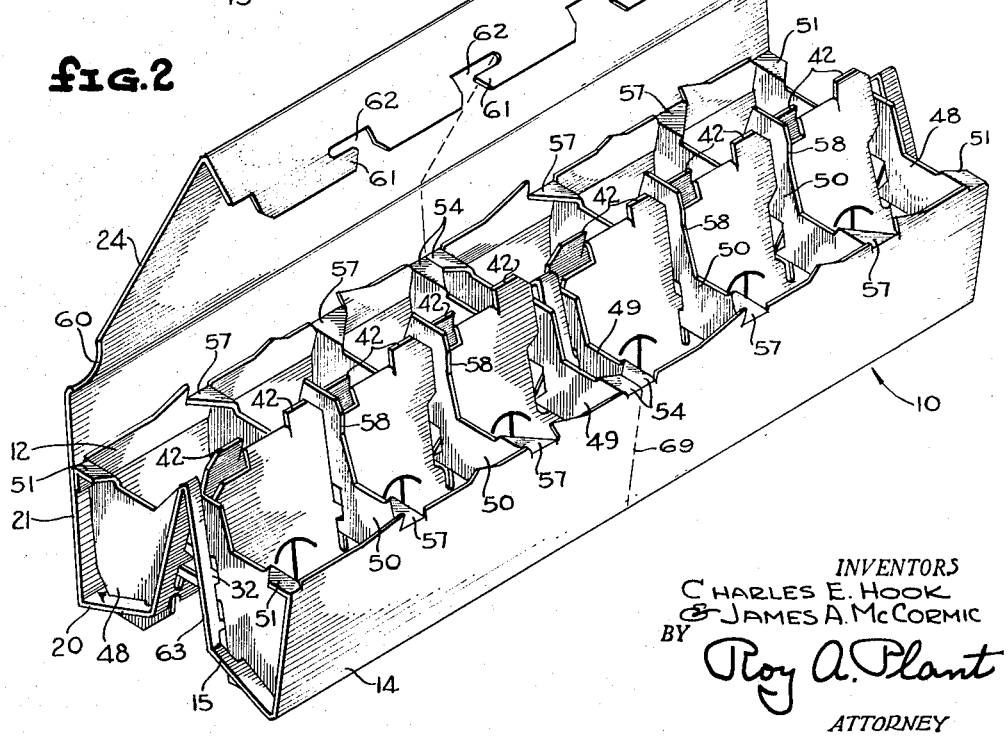

EGG CARTON

Filed Feb. 7, 1962  5 Sheets-Sheet 2

INVENTORS
CHARLES E. HOOK
& JAMES A. McCORMIC
BY
Roy A. Plant
ATTORNEY

May 17, 1966　　C. E. HOOK ETAL　　3,251,531
EGG CARTON
Filed Feb. 7, 1962　　5 Sheets-Sheet 3
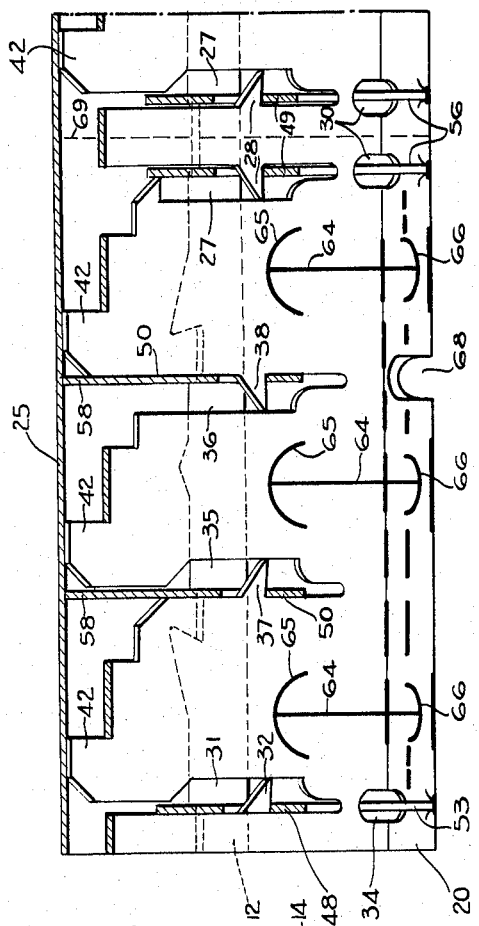
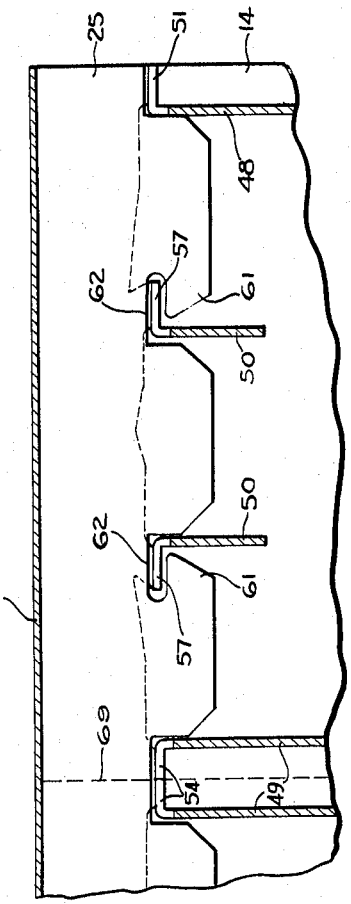
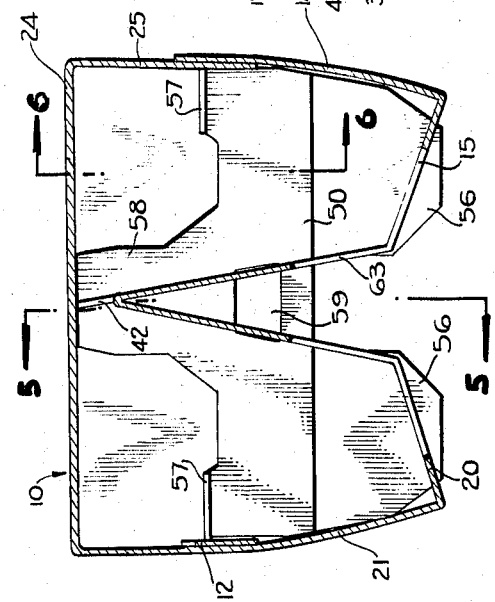
INVENTORS
CHARLES E. HOOK
& JAMES A. McCORMIC
BY
Roy A. Plant
ATTORNEY May 17, 1966  C. E. HOOK ET AL  3,251,531
EGG CARTON
Filed Feb. 7, 1962  5 Sheets-Sheet 4
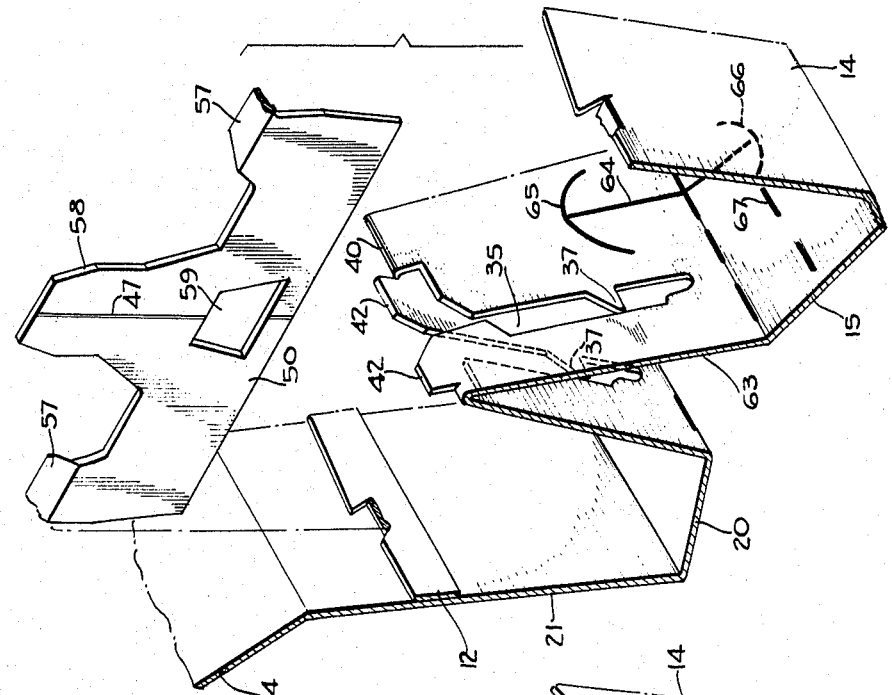
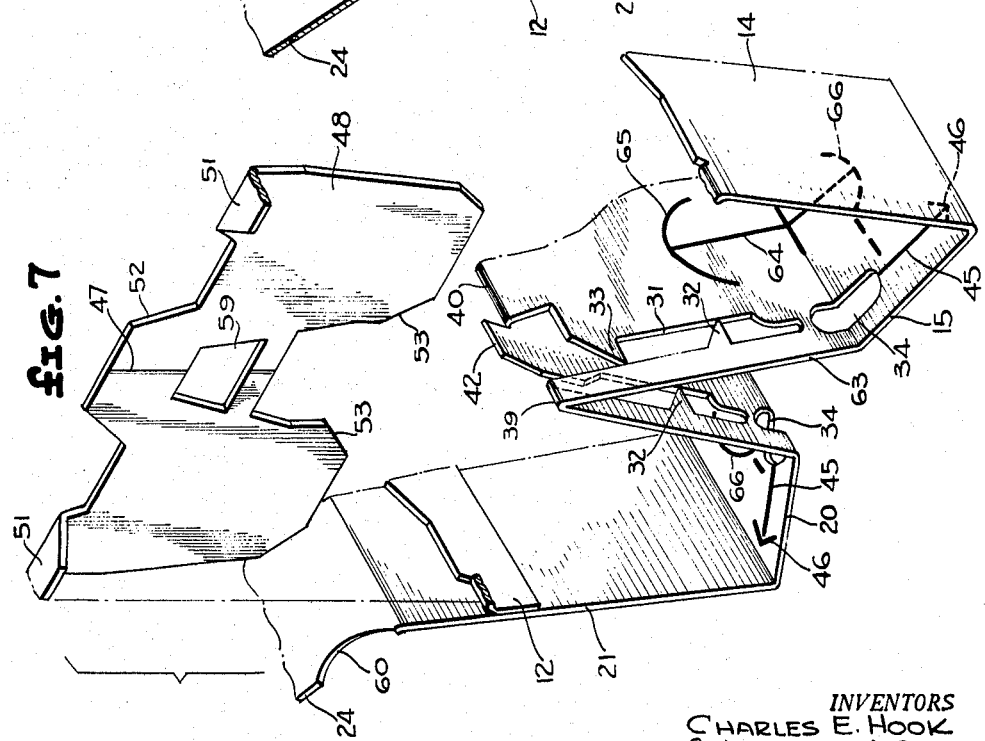
INVENTORS
CHARLES E. HOOK
& JAMES A. McCORMIC
BY
Roy A. Plant
ATTORNEY May 17, 1966  C. E. HOOK ETAL  3,251,531
EGG CARTON
Filed Feb. 7, 1962  5 Sheets-Sheet 5
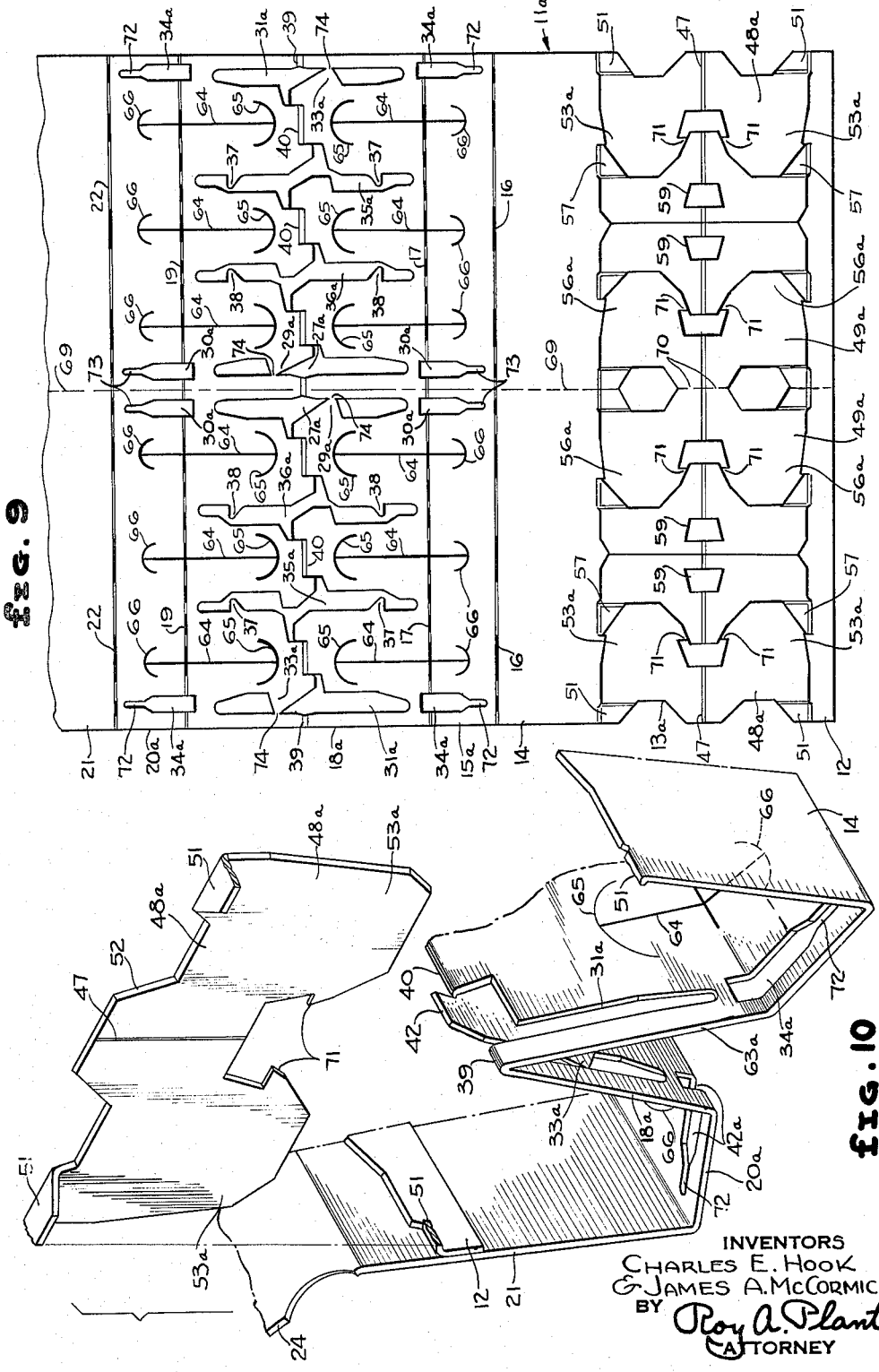
INVENTORS
CHARLES E. HOOK
& JAMES A. McCORMIC
BY Roy A. Plant
ATTORNEY

United States Patent Office 3,251,531
Patented May 17, 1966

3,251,531
EGG CARTON
Charles E. Hook and James A. McCormic, Battle Creek, Mich., assignors to Michigan Carton Co., Battle Creek, Mich., a corporation of Michigan
Filed Feb. 7, 1962, Ser. No. 171,617
10 Claims. (Cl. 229—28)

This invention relates in general to new and useful improvements in containers, and more particularly to a novel egg carton.

Eggs are commonly packed in dozen egg cartons and then stacked, all in the same direction, in wire crates or baskets with these egg cartons filled with eggs and stacked five cartons high. It thus will be apparent that if the egg crate or wire basket is dropped in the course of handling, this puts a terrific pressure on the bottom egg carton due to the weight of the four cartons of eggs resting on it. To aggravate this the egg cartons are narrower at their bottom than at their top with the bottom side edges of the carton resting inward of the side edges of the top panel of a next lower egg carton, which, with a low center ridge or inadequately supporting ridge for the carton cover allows the cover to depress when the wire basket with egg cartons is dropped with resultant breaking of eggs to commonly occur and especially in connection with those eggs which are a little longer than usual. It was a recognition of this problem and the need of an improved, commercially acceptable, egg carton less subject to breakage of eggs under the conditions noted which led to the conception and development of the present invention.

In view of the foregoing, it is a primary object of this invention to provide a novel egg carton having means for supporting the cover of same intermediate the side edges thereof and wherein the carton is much more rigid than usual and can stand rougher handling without breakage of eggs packaged therein.

Another object of this invention is to provide a novel egg carton for receiving eggs in two rows, the carton having an improved form of longitudinal center partition means extending centrally between the two rows of eggs and engaging the central portion of the cover of the carton to provide adequate support for the cover and thus prevent undue depression of the cover and breakage of the eggs contained therein.

Still another object of this invention is to provide a novel egg carton having means for supporting the cover thereof to prevent crushing of eggs packaged in the carton by depressing the cover under load, the egg carton having a central longitudinal partition means and transverse partition portions intersecting the longitudinal partition at spaced intervals, both the top of the longitudinal partition and the top of the transverse partition portions supporting the cover intermediate the edges thereof to provide the necessary support therefor.

A further object is to provide an egg carton which has transverse partition means and longitudinal partition means supporting the intermediate portion of the egg carton cover while using less carton stock for producing the egg carton than would be the case if the V-ridge of the center partition came into direct contact with the egg carton cover.

A further object of this invention is to provide a novel egg carton which may be readily folded from a generally rectangular blank having portions which may be folded to define egg receiving compartments and which portions have upwardly projecting parts defining a central longitudinal partition and spaced transverse portions for supporting the central portion of the cover of the carton against downward deflection.

A still further object of this invention is to provide a novel egg carton which includes an inverted V-shaped central longitudinal divider, spaced portions of the divider projecting upwardly from the apex of the divider with the spaced portions defining a central means engageable with the central portion of a cover of the carton to provide the desired support therefor.

Still further objects and advantages of the invention will appear as the description proceeds.

To the accomplishment of the foregoing and related ends, the invention, then, consists of the carton means hereinafter fully described and particularly pointed out in the claims, the annexed drawings and the following description setting forth in detail certain means for carrying out the invention, such disclosed means illustrating, however, but one of various ways in which the principle of the invention may be used.

In the annexed drawings:

FIGURE 1 is a perspective view of an egg carton made in accordance with the present invention, the cover of the egg carton being closed.

FIGURE 2 is a perspective view of the egg carton of FIGURE 1 with the cover open and showing the internal construction thereof.

FIGURE 4 is an enlarged transverse sectional view taken along the line 4—4 of FIGURE 1, looking in the direction of the arrows, and shows the manner in which the central portion of the carton is formed.

FIGURE 5 is a partial longitudinal sectional view taken along the line 5—5 of FIGURE 4, looking in the direction of the arrows, and shows further the details of the manner in which the central portion of the carton cover is supported.

FIGURE 6 is a fragmentary longitudinal sectional view taken along the line 6—6 of FIGURE 4, looking in the direction of the arrows, and shows the connection between a free edge of the cover and the remainder of the egg carton.

FIGURE 7 is an enlarged fragmentary perspective view of one end of the egg carton with the endmost transverse partition member being upwardly displaced to show the details thereof.

FIGURE 8 is an enlarged fragmentary perspective view taken through an intermediate portion of the egg carton with an intermediate transverse partition displaced to show the details thereof.

FIGURE 9 is a fragmentary plan view of a modified form of the blank shown in FIGURE 3 and from which the egg carton of the present invention may be formed.

FIGURE 10 is an enlarged fragmentary perspective view of one end of an egg carton formed from the blank of FIGURE 9, and wherein a different form of hooking the end partition in place is shown, and wherein the endmost transverse partition member is upwardly displaced to show the details thereof.

Figure 3:
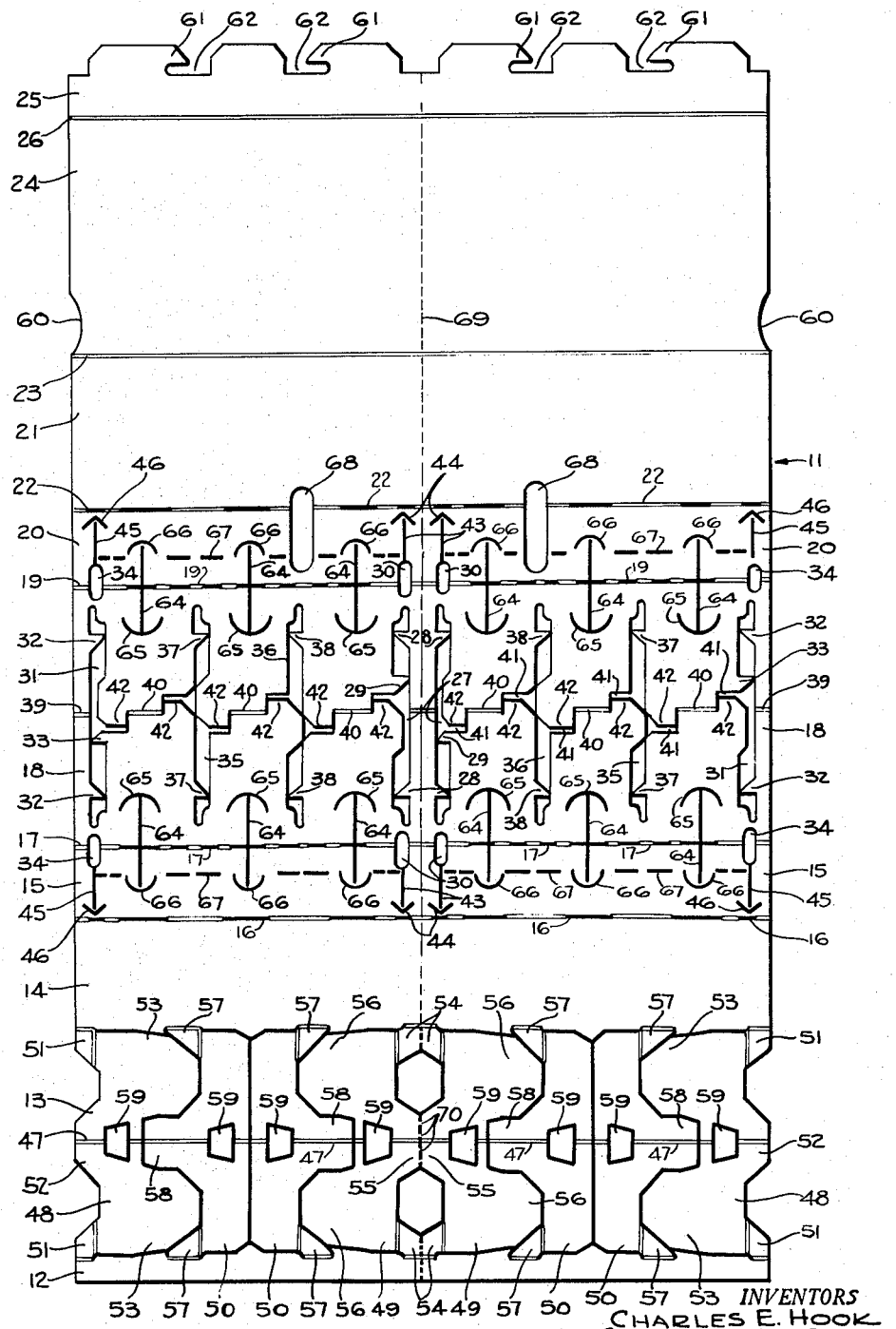
FIGURE 3 is a plan view of the blank from which the egg carton of FIGURE 1 is formed.

Reference is now made to the drawings in detail wherein the egg carton, which is the subject of this invention, is generally referred to by the numeral 10 and the overall details of which are best shown in FIGURES 1 and 2. The egg carton 10 is formed from a generally rectangular blank with a minimum of loss of paperboard stock, the blank being illustrated in FIGURE 3 and being generally referred to by the numeral 11.

The blank 11 is divided into a plurality of areas by transverse fold lines and cut lines. Starting with the bottom of the blank 11, as viewed in FIGURE 3, there is a narrow attaching flange 12 and then a transverse partition forming area 13 which is followed by a partial upstanding wall member 14. The wall member 14 is separated from an adjacent bottom member 15 by a combined fold and cut line 16. A combined fold and cut line 17 separates the bottom member 15 from an adjacent longitudinal partition forming area 18 which, in turn, is separated from a bottom member 20 by a combined fold and cut line 19. A full upstanding wall member 21 is disposed next to the bottom member 20 and is separated therefrom by a combined fold and cut line 22, and has an opposite edge thereof defined by a fold line 23. A cover panel 24 is disposed next to the wall member 21 and is separated from a partial wall member 25 and attached thereto along a fold line 26.

The blank 11 is generally symmetrical about a longitudinal center line 69, and the area 18 has a central pair of longitudinal cut-outs 27 into each of which a pair of outwardly directed triangular locking tabs 28 project. An inwardly directed triangular camming tab 29 also projects into each cut-out 27. Oval cut-outs 30 bridge the combined fold lines 17 and 19 at the ends of the cut-outs 27. An outer pair of longitudinal cut-outs 31 is disposed adjacent the side edges of the blank 11. The cut-outs 31 are similar to the cut-outs 27 and each cut-out 31 has a pair of inwardly directed triangular locking tabs 32 projecting thereinto, together with an outwardly directed triangular camming tab 33. An oval cut-out 34 bridges each of the combined fold and cut lines 17 and 19 in alignment with the cut-outs 31.

Intermediate longitudinal cut-outs 35 and 36 are disposed intermediate each set of the cut-outs 27 and 31 with the cut-outs 35 being adjacent the cut-outs 31 and the cut-outs 36 being adjacent the cut-outs 27. A pair of inwardly directed triangular locking tabs 37 project into each cut-out 35 and a pair of outwardly directed triangular locking tabs 38 project into each cut-out 36.

A pair of aligned transverse fold lines 39 extend inwardly from the edges of the blank 11 to the cut-outs 31. Other fold lines 40 are disposed intermediate the cut-outs 27, 36, 35 and 31 in alignment with the fold lines 39 in the central part of the area 18 so that the area 18 may be folded to an inverted V-shape. At the ends of each fold line 40 is an L-shaped open cut 41 which opens into an adjacent one of the cut-outs 27, 31, 35 and 36. Each of the open cuts 41 defines a projecting tab 42.

Each of the cut-outs 30 has a longitudinal cut 43 extending therefrom towards the adjacent end of the blank 11. Each cut 43 terminates remote from its associated cut-out 30 in, but short of reaching, a V-shaped cut 44. Similar cuts 45 extend from the cut-outs 34 and terminate in, but short of reaching, V-shaped cuts 46.

The area 13 is provided with an interrupted central transverse fold line 47 and is divided into a pair of outer transverse partitions 48 and a pair of central transverse partitions 49 which are identical with the partitions 48. A pair of identical partitions 50 are disposed between each set of partitions 48, 49. The partitions 48, 49 and 50 are symmetrical about the fold line 47.

The partitions 48 are connected to the flange 12 and the wall member 14 by tabs 51 connected to upper portions thereof for folding to parallel positions. Each partition 48 has a slightly upwardly projecting central portion 52 and a pair of spaced depending portions 53. The partitions 49 are connected to the flange 12 and the wall member 14 by tabs 54 identical to the tabs 51. The partitions 49 are foldable to positions parallel to the partitions 48 and have central portions 55 corresponding to the portions 52 and depending portions 56 corresponding to the portions 53. These central portions 55 are preferably temporarily joined together by means of nicks 70 which hold the transverse partitions 49 flat until the blank is set up into carton form when these nicks 70 are broken.

Each of the partitions 50 is connected to the flange 12 and the wall member 14 by tabs 57. Each partition 50 has an upwardly projecting central portion 58 and a flat bottom. The partitions 50 are pivotable to positions parallel to the partitions 48 and 49, and each of the partitions 48, 49 and 50 is provided with a locking tab receiving opening 59.

The cover panel 24 is provided with finger cut-outs 60 in the outer edges thereof adjacent the fold line 23 which, if desired, may be used to facilitate the lifting of the egg carton 10 from a crate (not shown).

The free edge of the wall member 25 is provided with a plurality of locking tabs 61 projecting into cut-outs 62. The tabs 61 serve to lock the cover panel 24 in a carton closing position in a manner to be described hereinafter.

When the blank 11 is folded to form the egg carton 10, FIGURE 2, the area 18 is folded along the fold line 39, 40 with the area 18 having an inverted V-shaped cross section to define a center longitudinal partition 63. The bottom members 15 and 20 slope downwardly and outwardly from the lower edges of the center partition 63, and the wall members 14 and 21 slope upwardly and outwardly from the outer edges of the bottom members 15 and 20, respectively. The partitions 48, 49 and 50 are disposed generally normal to the partition 63 and the wall members 14 and 21 and extend between the wall members 14 and 21. The flange 12 is adhesively secured to the wall member 21 below the upper edge thereof as clearly shown in FIGURE 2.

The partitions 48 extend through the cut-outs 31 and the portions 53 thereof project through the cut-outs 34 and the cuts 45. The locking tabs 32 pass through the openings 59 to lock the partitions 48 in place while the tabs 33 bear thereagainst to stabilize the partitions 48 in upright position. In a similar manner the partitions 49 extend through the cut-outs 27 and the portions 56 thereof extend through the cut-outs 30 and the cuts 43. The locking tabs 28 pass through the openings 59 in the partitions 49 to lock the partitions 49 in place while the tabs 29 bear thereagainst to stabilize the partitions 49 in upright position. The partitions 50 extend through respective areas of the cut-outs 35, 36 and the locking tabs 37, 38 extend through the openings 59 of the respective partitions 50 to lock them in place.

When the egg carton 10 is completely assembled, as shown in FIGURE 2, for example, the interior thereof is divided into a plurality of individual egg receiving pockets by the partitions 48, 49, 50 and 63. The bottom of each of these pockets is slightly expansible due to the provision of a split 64 extending down the partition 63 and partially across the associated one of the bottom members 15 and 20. The upper end of each slit 64 terminates in a downwardly facing C-shaped cut 65, and the other end of each slit 64 terminates in an oppositely facing C-shaped cut 66 which is preferably smaller than C-shaped cut 65 so as to support an egg in the carton with a little cushioning provided by the cut 66. Each of the cuts 66 may, if desired, terminate along a partial cut line 67 in its respective bottom member 15 and 20. There are also provided enlarged oval cut-outs 68 extending substantially across the bottom member 20 and into the wall member 21 in alignment with the cut-outs 36. These cut-outs 68 are required when the egg carton is set up by some forms of egg carton set-up machines.

Reference is now made to FIGURES 4 and 5 wherein it is shown that the tabs 42 project above the remainder of the partition 63 with the upper edges of the tabs 42 lying substantially in a common plane with the upper edges of the portions 58 of the partitions 50. This is a primary feature of the egg carton 10. The portions 58 provide transverse supports for the central portion of the cover panel 24 at spaced intervals while the tabs 42 provide longitudinal supports for the central portion of the cover panel 24. In this manner downward deflection of the central portion of the cover panel 24 due to loads placed thereon in the handling of crates of egg cartons 10 is substantially prevented, and heretofore crushing of eggs packed in the egg cartons is substantially eliminated.

It is to be noted that the cover panel 24 is substantially flat and supported both at its center and side edges.

The edge of the cover panel 24 integrally connected to the wall member 21 is, of course, supported thereby. When the cover panel 24 is locked in a carton closing position, FIGURES 1 and 6, the wall member 25 carried thereby rests upon the tabs 51, 54 and 57, as is best shown in FIGURE 6, to provide the necessary support for the wall member 25. In this manner downward collapsing of the edges of the cover panel 24 is substantially prevented under normal operating conditions. At the same time, the locking tabs 61 engage beneath the tabs 57, which are seated in the cut-outs 62, to releasably lock the wall member 25 in place.

Referring now to FIGURES 9 and 10, which are similar to FIGURES 3 and 7, and which show a modification of the egg carton of the present invention. Here the transverse partitions 48a and 49a lack the tab receiving opening 59 of transverse partitions 48 and 49, FIGURE 3. The locking tabs 28 and 32 which formerly engaged openings 59 in the transverse partitions 48 and 49 have also been eliminated, and locking tabs 71, FIGURES 9 and 10, have been placed on the inner edge of each of the depending portions 53a and 56a of transverse partitions 48a and 49a in position to engage cut-outs 34a and 30a, and these two cut-outs continue into short open slots 72 and 73 in the place of the slit type cuts 45 and 43, FIGURE 3. Also the V-shaped cuts 46 and 44, FIGURE 3, have been eliminated along with cut lines 67. This leaves the transverse partitions 48a and 49a hooked into upright position in the set-up egg carton, but in a different manner than is the situation where the blank of FIGURE 3 is used to form an egg carton. In other words instead of hooking the transverse partitions 48a and 49a in upright position in the set-up carton by means of locking tabs 32 and 28 of the longitudinal partition 63, FIGURE 3, these transverse partitions are hooked to the longitudinal partition 63a by means of locking tabs 71 carried by the transverse partitions 48a and 49a themselves, with these locking tabs hooking into the inner end portion of cut-outs 34a and 30a of the longitudinal partition 63a, FIGURES 9 and 10.

The cut-outs 31a and 27a each have a nick 74 which temporarily separates each of these cut-outs into two parts in order to facilitate handling the blank up to the time same is passed through the carton set-up machine (not shown) which, during the setting up of the egg carton, breaks these nicks and leaves a camming tab 33a at cut-out 31a, and a camming tab 29a at cut-out 27a. These camming tabs hold the transverse partitions 48a and 49a in stabilized upright position in cut-outs 31a and 27a. Also in FIGURES 9 and 10 it will be noted that the cut-outs 31a, 35a, 36a and 27a for the reception of the transverse partitions have been opened up to a limited extent to provide for easier removal of the cut-out stock, and also to permit freer entry of the transverse partitions during the setting up of the carton while still holding the transverse partitions in suitable position after the carton has been set up ready to receive eggs or the like.

From the foregoing, it will be apparent that there has been devised a carton especially adapted for handling items such as eggs and which may be formed from the conventional size of blank, but which blank has been configurated in a manner wherein the assembled egg carton provides both longitudinal and transverse supports for the central portion of the cover panel thereof. Accordingly, the cover panel 24 of egg carton 10 is supported both on tabs 42 of longitudinal partition 63 and the top portions 58 of the transverse partitions so that the carton 10 may take a greater loading on the cover panel thereof without collapsing than was heretofore possible.

It will thus be readily apparent that novel and advantageous provision has been made for carrying out the desired ends hereinbefore set forth. However, attention is directed to the fact that variations may be made in the egg carton constructions disclosed herein without departing from the spirit and scope of the invention as above described and illustrated in the drawings.

Other modes of applying the principle of our invention may be employed instead of those explained, change being made as regards the egg carton and combinations herein disclosed, provided the means stated by any of the following claims or the equivalent of such stated means be employed.

We therefore particularly point out and distinctly claim as our invention:

1. An egg carton of the machine set-up type having spaced wall members, bottom members, an inverted V-shaped ridge open from the bottom to the top thereof and forming a longitudinal partition connecting together said bottom members with the bottom of said carton being elevated in its central portion and narrower than the top of said carton, transverse partitions half of which are deep and reach to the bottom of said carton while half are shallow with unbroken bottoms with a perforation through same adjacent but spaced from said bottom, said transverse partitions cooperating with said longitudinal partition to separate the interior of the egg carton into a multiplicity of individual egg receiving pockets, said inverted V-shaped ridge being cross slit to receive said transverse partitions with said slits which receive at least the bottom portion of said shallow transverse partitions having hooks for engaging said perforation to anchor and hold said shallow partitions in set-up position, and a cover member normally closing said egg carton, said longitudinal partition having longitudinally aligned portions extending above said ridge, with one adjacent each cross partition at the end of each pair of opposite individual egg receiving pockets and engaging the central under portion of said cover member and forming two spaced apart rows of longitudinal supports therefor.

2. The egg carton of claim 1 wherein certain of said transverse partitions have upwardly projecting portions substantially engaging and crosswise supporting said cover member between adjacent pairs of said longitudinal partition aligned supporting portions, said adjacent pairs of longitudinal partition supporting portions having opposite inclinations on opposite sides of said transverse partition.

3. The egg carton of claim 1 wherein said longitudinal partition has a series of upper open bottom fold line ridge forming portions disposed in alignment, there being one said fold line portion and two of said longitudinally aligned upwardly projecting portions, with one at each end of said fold line portion, between each pair of adjacent transverse partitions forming the end walls of an egg receiving pocket, part of said longitudinal partition aligned ridge forming portions also being disposed at each end of said carton in position to support the outer side of each of the endmost transverse partitions and hold same in upright position.

4. The egg carton of claim 3 wherein the two upwardly projecting portions at the opposite ends of each of said longitudinal partition aligned ridge forming portions of an individual egg receiving pocket and between adjacent transverse partitions, are in the form of oppositely inclined and upwardly extending cover member supporting members with one being in the plane of one side of said inverted V-shaped ridge and the other in the plane of the other side.

5. In a cardboard egg carton of the machine set-up type utilizing a rectangular blank with substantially parallel sides throughout and divided into a multiplicity of egg receiving pockets by means of an inverted V-shaped center ridge with cross slits and cross partitions fitting into said cross slits, said cross partitions being of both wide and shallow form, said shallow cross partitions having an unbroken bottom with a perforation above same and said cross slots receiving said shallow partitions having hooks which engage said perforations and anchor said shallow cross partitions in place, said carton having a releasable cover member, said inverted V-shaped center ridge having short extensions projecting from the top of same with the ends of said extensions normally engaging the underside of said cover member above said ridge and forming two spaced apart longitudinal rows of extensions with two between each pair of cross partitions and closely adjacent same for supporting the central portion of said cover.

6. The egg carton of claim 5 wherein said two rows of short extensions of said ridge portion are in the form of a multiplicity of spaced tabs, which are wider than they are long, extending upward from and in line with the opposite sides of said V-shaped ridge.

7. The egg carton of claim 5 wherein each of said pockets are defined at one side by said inverted V-shaped longitudinal partition and at each end by cross partitions, each of said ridge extensions alternately coming from opposite side portions of said V-shaped longitudinal partition and in the plane of same while projecting toward and substantially in contact with said cover member when it is in closed position.

8. The egg carton of claim 5 wherein each of said pockets are defined at each end by cross partitions and at one side by a longitudinal partition formed by two panels disposed in an inverted V-shaped relation and joined by an upper fold line well below said cover member, said fold line having spaced short extensions alternately coming out of first one and then the other of said panels, said extensions being in the form of spaced tabs, which are wider than they are long, extending from the top of said panels, said tabs being disposed at opposite ends of each fold line portion between a pair of egg receiving pockets at opposite sides of said ridge and adjacent said cross partitions.

9. The egg carton of claim 8 wherein the short tabs at opposite ends of each fold line portion between a pair of opposite egg receiving pockets are a unit part of said V-shaped center ridge and extend alternately from different ones of said two panels forming said ridge, thus providing two rows of tabs with one row on each side of the longitudinal center line of said ridge portion and with the ends of said tabs of both rows being substantially in a common plane in position to support said cover over a wider area than just the center line of said ridge portion.

10. A cardboard egg carton of the machine set-up type utilizing a rectangular blank with substantially parallel sides throughout and divided into a multiplicity of side-by-side pairs of egg receiving pockets formed by spaced wall members, bottom members, an inverted V-shaped ridge longitudinal partition open from top to bottom and connecting together said bottom members with the bottom of said carton being elevated in its central portion and narrower than the top of said carton, transverse partitions cooperating with said longitudinal partition which has cross slots for receiving said transverse partitions and holding same in upright position, half of said transverse partitions being deep and reach the bottom of said carton while half are shallow with unbroken bottoms with a perforation through same adjacent but spaced from said bottom, hook means for holding all of said transverse partitions in assembled position against withdrawal from said cross slots of said carton when set up, said shallow transverse partitions being held by hooks in said cross slots which engage said perforations, and a cover member normally closing said egg carton, said V-shaped ridge being adjacent but spaced well below said cover when said carton is closed, said ridge having extensions alternately projecting from opposite side portions of said longitudinal ridge partition and forming two spaced apart longitudinal rows of extensions with two being between each pair of cross partitions and closely adjacent the sides of same with the upper end of said extensions normally contacting the under side of said cover when closed, and at least half of said cross partitions having a portion extending substantially into contact with the under side of said cover for crosswise supporting of the latter in cooperation with said two rows of lengthwise extensions projecting from said ridge.

References Cited by the Examiner
UNITED STATES PATENTS

| Re. 19,625 | 6/1935 | Levkoff | 229—29 |
| 1,922,145 | 8/1933 | Troyk | 229—29 |
| 1,962,296 | 6/1934 | Burger | 229—29 |
| 2,664,233 | 12/1953 | Burger | 229—28 |
| 2,718,347 | 9/1955 | Inman | 229—28 |
| 2,974,849 | 3/1961 | Swanson | 229—28 |
| 3,034,696 | 5/1962 | Swanson | 229—28 |

GEORGE O. RALSTON, *Primary Examiner.*